United States Patent [19]
Smith

[11] 3,722,680
[45] Mar. 27, 1973

[54] HEMODIALYSIS APPARATUS

[76] Inventor: Frank R. Smith, 3848 S. Pine Street, Tacoma, Wash. 98411

[22] Filed: Mar. 17, 1971

[21] Appl. No.: 125,110

[52] U.S. Cl. .....................210/96, 210/186, 210/195, 210/321
[51] Int. Cl. ............................................B01d 31/00
[58] Field of Search..........210/194, 22, 321, 96, 186, 210/195

[56] References Cited

UNITED STATES PATENTS

| | | | |
|---|---|---|---|
| 3,527,700 | 9/1970 | Goldhaber | 210/321 X |
| 3,506,126 | 4/1970 | Serfass et al. | 210/258 X |
| 3,484,369 | 12/1969 | De Dobbeleer | 210/22 |
| 3,508,656 | 4/1970 | Serfass et al. | 210/321 X |
| 3,563,381 | 2/1971 | Edelson et al. | 210/96 |

*Primary Examiner*—Frank A. Spear, Jr.
*Attorney*—Eugene D. Farley

[57] ABSTRACT

Dialysate delivery apparatus for use with a hemodialyzer provided with a dialysate inlet and a dialysate outlet comprises conduit means coupled to the inlet and outlet of the hemodialyzer as well as to a waste discharge. A fresh dialysate storage reservoir and a used dialysate recirculating reservoir communicate with the conduit means. A fresh dialysate pump is arranged in the conduit means for withdrawing fresh dialysate from the storage reservoir and circulating it to the inlet of the hemodialyzer. A used dialysate pump is arranged in the conduit means for drawing used dialysate from the hemodialyzer and circulating it to the recirculating reservoir. The conduit means also includes valve means which functions to combine a predetermined proportion of the used dialysate with the fresh dialysate being circulated to the inlet of the hemodialyzer, and to circulate a predetermined proportion of the used dialysate to and from the dialyzer as well as to the waste discharge. In this manner maximum economy of dialysate and maximum efficiency of operation of the hemodialyzer are achieved.

11 Claims, 1 Drawing Figure

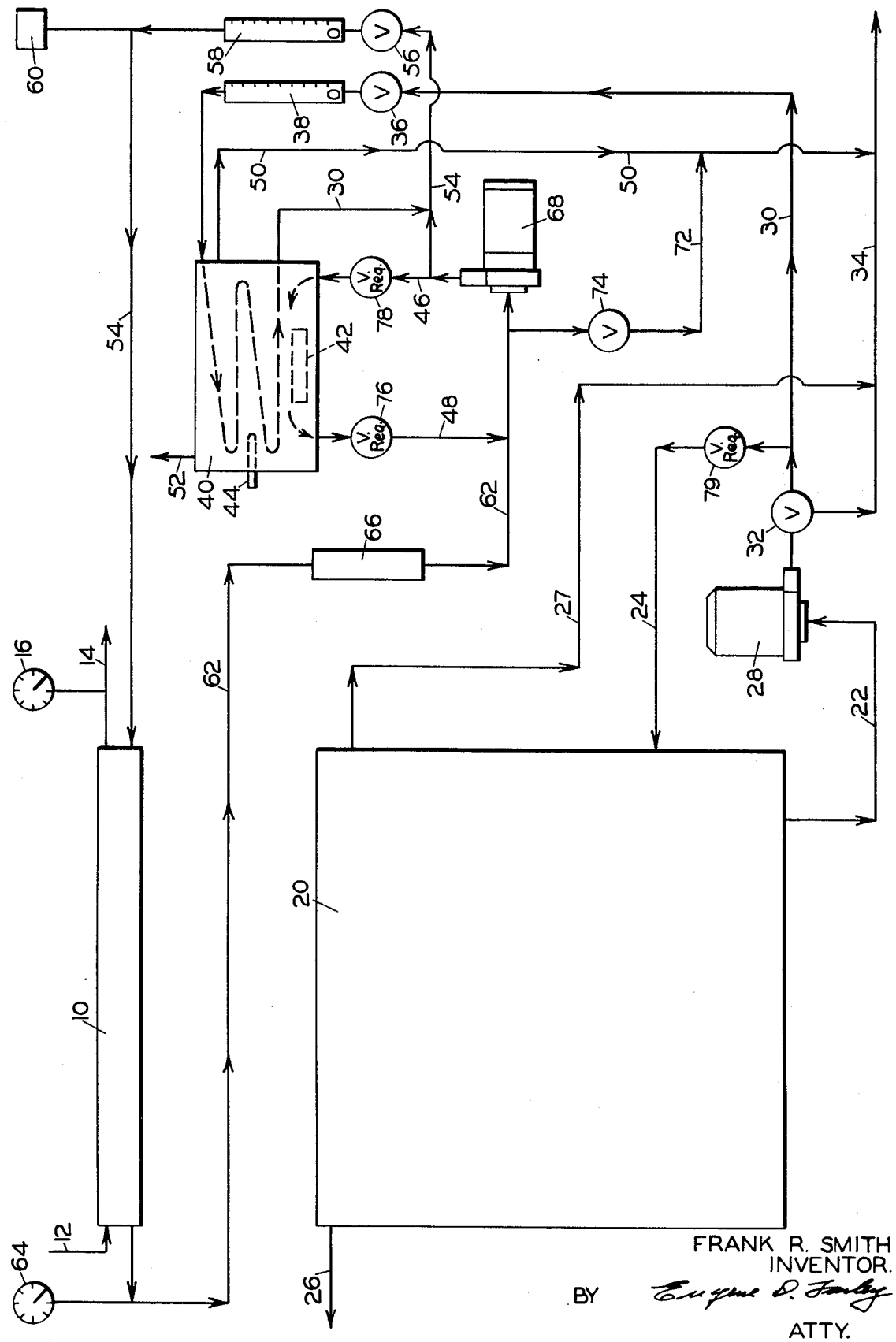
PATENTED MAR 27 1973  3,722,680
FRANK R. SMITH
INVENTOR.
BY
ATTY.

HEMODIALYSIS APPARATUS

This invention relates to hemodialysis.

Irreversible kidney failure creates in the patient a toxic condition characterized by the presence of excess water and waste products, including urea, creatinine, uric acid and various inorganic salts including the chlorides and phosphates of sodium and potassium. Unless removed, these materials cause the death of the patient.

Development of the artificial kidney operating on the principles of hemodialysis has provided an apparatus and technique for relieving this condition and materially extending the life of the patient.

Although used widely and successfully, the present day hemodialysis apparatus (artificial kidney) is relatively inefficient, wasteful of costly dialysate, hazardous in operation, not adaptable to home use, requires expert professional help and hospitalization, is difficult to control, and is bulky and cumbersome.

It is the general purpose of the present invention to provide hemodialysis apparatus which overcomes the foregoing problems and which in addition may be incorporated in a cabinet of relatively small size adapted to be used by the patient in his own home.

The manner in which the foregoing and other objects of this invention are accomplished will be apparent from the accompanying specification and claims considered together with the drawings wherein the single FIGURE comprises a schematic flow diagram of the herein described hemodialysis apparatus.

In its broad aspect, the herein described hemodialysis apparatus comprises a dialysate delivery apparatus adapted for use with a hemodialyzer provided with a dialysate inlet and a dialysate outlet.

The apparatus comprises dialysate conduit means coupled to the inlet and outlet of the hemodialyzer as well as to a waste discharge. A fresh dialysate storage reservoir and a used dialysate recirculating reservoir communicate with the conduit means. A fresh dialysate pump is arranged in the conduit means for withdrawing fresh dialysate from the storage reservoir and delivering it to the inlet of the hemodialyzer. A used dialysate pump is arranged in the conduit means for drawing used dialysate from the hemodialyzer and circulating it to the recirculating reservoir. The conduit means are arranged with flow control valve means adapted to combine a predetermined proportion of the used dialysate with the fresh dialysate being delivered to the inlet of the hemodialyzer, and to circulate a predetermined proportion of the used dialysate to the waste discharge. In this manner maximum economy of dialysate and maximum efficiency of operation of the hemodialyzer are achieved.

Considering the foregoing in greater detail and with particular reference to the drawings:

The dialysate delivery system of my invention is designed for use with a dialyzer indicated generally at 10 in the drawing. This may be any one of several standard units, for example, the Kolff, the Kiil, the Coil or the Mini-Klung hemodialyzers.

These and other commercial units remove excess water and toxic substances from the blood by well known dialysis techniques in which the blood is circulated through a semi-permeable membrane which separates the blood on one side of the membrane from an isotonic dialysate liquid on the other. The semi-permeable membrane of the dialyzer is impermeable to the blood proteins. Thus the inherent aqueous and saline equilibrium of the blood is preserved and the loss of useful bodies is avoided. On the other hand, excess water and waste products such as uric acid, urea, creatinine and other diffusible nitrogenous compounds pass through the membrane and thus are separated from the blood.

In the schematic representation of the drawings, hemodialysis unit 10 is supplied with blood drawn by cannulation from an artery of the patient through a blood infeed conduit 12. The blood passes through the hemodialysis unit and exits through an outfeed blood line 14 provided with a suitable blood pressure monitor gauge 16. The outfeed blood line is cannulated to a vein of the patient.

Hemodialysis unit 10 is supplied with dialysate by means of dialysate delivery apparatus which may be arranged in compact form so that it all may be mounted in a wheeled cabinet for convenience of operation. The delivery apparatus is supplied with fresh dialysate from a fresh dialysate reservoir 20. This reservoir is made of a strong structural material which is easy to keep sanitary, preferably from fiberglass.

It is a feature of the invention that the unit is not dependent upon pressurized house water lines which, because of fluctuating water pressure, present a hazard to the patient. Accordingly, reservoir 20 is of sufficient capacity to be self sufficient for one complete dialysis treatment lasting 10 or 12 hours. This will require from 60 to 210 liters.

Reservoir 20 is provided with an outlet conduit 22, an inlet conduit 24, an air and gas vent 26, and an overflow line 27.

A pump 28, which preferably is a magnetically driven centrifugal pump, draws fresh dialysate from reservoir 20 and passes it to a conduit 30 provided with a three-way valve 32. The third opening of this valve communicates with a waste conduit 34 which leads to the drain.

Also in series in conduit 30 is a flow control valve 36 and a fresh dialysate flow meter 38, both of which may be of conventional construction.

Pump 28 is operated at a speed such that when flow control valve 36 is set at the operating flow rate, excess dialysate is returned to reservoir 20 via conduit 24 at a velocity such that the fresh dialysate within the reservoir is continuously stirred and mixed.

Line 30 passes in heat exchange relation into a second reservoir. This is a used dialysate recirculating reservoir indicated generally at 40. This also may be made of fiberglass. It is of relatively small volume as compared with reservoir 20, having a capacity of less than about 15 percent of the latter. It is equipped with an electrical heating unit 42 controlled by means of a thermostat 44.

Reservoir 40 further is provided with an infeed conduit 46, an outfeed recirculating conduit 48, an overflow conduit 50, and an air or gas vent 52.

Fresh dialysate heated to the required temperature by the heat exchanger housed in recirculating reservoir 40 enters another conduit 54 which feeds the dialyzer. To regulate the flow in the dialyzer infeed conduit, there is provided a flow control valve 56, a second flow meter 58, and a combination pressure and vacuum switch 60.

Conduit 54 is coupled with the dialysate inlet of dialyzer 10. It discharges the dialysate liquid into the dialyzer. Within the dialyzer the dialysate performs its usual function and is discharged at the dialyzer outlet into a conduit 62. This conduit is provided in series with a negative pressure gauge 64, which has for its function measuring the vacuum within the dialyzer, and a blood leak detection cell 66, having for its function the detection of any blood leaks within the dialyzer. Both of these items may be of conventional construction.

Conduit 62 communicates with and feeds recirculating pump 68. Like pump 28, pump 68 preferably is of the magnetically driven centrifugal type.

The dialysate exhausted from pump 68 is divided into two fractions. One enters conduit 54, where it is mixed with fresh dialysate entering the same conduit by conduit 30. The other fraction passes via conduit 46 into used dialysate recirculating reservoir 40.

In reservoir 40, part of the used dialysate is passed to overflow conduit 50 at a rate which removes used dialysate at a rate equal to the input of fresh dialysate into the system. This may be, for example, at a rate of 250 ml. per minute.

The used dialysate passes from conduit 50 into drain conduit 34. A branch conduit 72 interconnects conduit 62 and conduit 50. It is provided with a valve 74 and serves as a connection with drain line 34 by means of which recirculating reservoir 40 may be drained for cleaning.

Means are provided for regulating accurately the negative pressure in conduit 62 and hence within the dialyzer. Control of this pressure is of the utmost importance since it controls the rate at which fluid is removed from the blood of the patient. If such fluid is removed too rapidly, the blood pressure of the patient is lowered unduly and the patient is subject to shock. If sufficient fluid is not removed from the blood, the patient may be subject to congestive heart failure.

Accordingly, a negative pressure regulating valve 76 is provided in line 48. This valve controls the negative pressure in the system to within precise limits.

Regulating valves 78 and 79 also are provided. These balance the out flow pressure of both pumps as required to obtain uniform flow from the pumps to the flow meters.

The operation of the apparatus is as follows:

First the entire system is sterilized with a disinfectant chemical such as formalin. This is accomplished by partly filling the fresh dialysate reservoir with aqueous formalin solution and recirculating the solution through the system. Just prior to dialysis, the formalin solution is drained off and the system flushed with fresh water.

Working strength dialysate is prepared in the fresh dialysate reservoir and carefully checked for proper concentration.

Fresh dialysate is pumped by operation of pump 28 through line 30 at a predetermined rate. This may be of the order of 250 ml. per minute, the rate being controlled by flow control valve 36 and flow meter 38. After passage through heated, used dialysate recirculating reservoir 40, the fresh dialysate joins used dialysate in conduit 54. Further control is achieved by means of flow control valve 56 and flow meter 58. The dialysate mixture then enters dialyzer 10, where it treats the blood of the patient which enters the dialyzer via blood line 12 and leaves via blood line 14.

The used dialysate leaves the dialyzer via conduit 62, passes through blood leak detection cell 66 and is pumped by pump 68 into used dialyzer recirculating reservoir 40. Optimum recirculation of dialysate through the dialyzer is between 500 and 6,000 ccs. per minute, depending upon the type of dialyzer being used.

The flow of used dialysate passing through pump 68 is divided. Part joins the fresh dialysate in conduit 54. Part is recycled via recirculating reservoir 40. Excess used dialysate leaves the reservoir via conduit 50 which feeds into conduit 34 leading to the drain, thus removing dialysate in an amount commensurate with the fresh dialysate which is added. The treatment thus proceeds continuously for the desired duration, without the necessity of replenishing fresh dialysate reservoir 20.

The system above described has several significant advantages, as compared with the conventional once-through system.

In the first place, since the dialysate is recirculated, with resultant increased efficiency of operation, a substantial financial saving is gained. In a typical instance this amounts to one-half or more of the cost of the chemicals used to make up the fresh dialysate. This in turn amounts to a saving of several hundred dollars per year to the patient.

Furthermore, the safety of the operation is very largely increased. This stems from several factors. The negative pressure of the dialyzer is subject to very precise control. Used dialysate never is mixed with the fresh dialysate in the fresh dialysate reservoir. This avoids contamination. Precise temperature control is achieved. There is no operational dependence upon fluctuating water pressure from the house line. Provision is made for removal of trapped air and gases. Bacterial contamination is minimized by easy sterilization and also by inhibition of significant bacterial growth because of high recirculating flow rate and the small size of the used dialysate recirculating reservoir. The complex electronic dialysate monitor required in all prior art dialysate proportioning machines, is not necessary because the dialysate is prepared in a batch and tested before use.

These advantages are obtained, furthermore, by the provision of a system which may be incorporated in a portable unit of relatively low cost, adaptable for home use.

Having thus described my invention in preferred embodiments, I claim:

1. For use with a hemodialyzer provided with a dialysate inlet and a dialysate outlet, dialysate delivery apparatus comprising:
   a. infeed and outfeed dialysate conduit means coupled to the inlet and outlet, respectively, of the hemodialyzer,
   b. a fresh dialysate storage reservoir having an outlet,
   c. a used dialysate recirculating reservoir having an inlet, an outlet and an overflow to waste,
   d. first pump means having an inlet coupled to the outlet of the fresh dialysate storage reservoir and an outlet coupled to the infeed conduit means, e. second pump means having an inlet coupled to the outfeed conduit means and to the outlet of the used dialysate recirculating reservoir, and an outlet coupled to the infeed conduit means and to the inlet of the used dialysate recirculating reservoir, whereby to effect mixing of fresh and used dialysate for delivery to the hemodialyzer, and f. control valve means communicating the outlet of the used dialysate recirculating reservoir with the inlet of the second pump means independently of the hemodialyzer for controlling the negative pressure in the hemodialyzer.

2. The dialysis delivery apparatus of claim 1 including recirculating conduit means communicating the outlet of the first pump means with the fresh dialysate storage reservoir for recirculating a predetermined amount of fresh dialysate to the dialysate storage reservoir at a velocity calculated to stir the fresh dialysate contents thereof.

3. The dialysate delivery apparatus of claim 1 including heat exchanger means contained in the used dialysate recirculating reservoir in series relation with the infeed conduit means carrying fresh dialysate from the outlet of the first pump means.

4. The dialysate delivery apparatus of claim 3 including thermostatically controlled heating means associated with the used dialysate recirculating reservoir for maintaining the temperature of the used dialysate contents thereof at a predetermined temperature level.

5. The dialysate delivery apparatus of claim 1 including blood leak detection cell means in series in the outfeed conduit means downstream from the hemodialyzer outlet.

6. The dialysate delivery apparatus of claim 1 wherein the used dialysate recirculating reservoir has a capacity of less than about 15 percent of that of the fresh dialysate storage reservoir.

7. The dialysate delivery apparatus of claim 1 including regulating valve means communicating the outlet of the second pump means with the inlet of the used dialysate recirculating reservoir for controlling the proportion of used dialysate recycled to the used dialysate recirculating reservoir.

8. The dialysate delivery apparatus of claim 1 including first regulating valve means communicating the outlet of the second pump means with the inlet of the used dialysate recirculating reservoir for controlling the proportion of used dialysate recycled to the used dialysate recirculating reservoir, and second regulating valve means communicating the outlet of the first pump means with the fresh dialysate storage reservoir for controlling the proportion of fresh dialysate recycled to the fresh dialysate storage reservoir, said first and second regulating valve means being arranged to balance the outflow pressure of both the first and the second pump means as required to obtain uniform flow therefrom.

9. The dialysate delivery apparatus of claim 1 including control valve means in the infeed conduit means arranged for controlling the flow of fresh dialysate to the outlet of the second pump means.

10. The dialysate delivery apparatus of claim 1 including control valve means in the infeed conduit means arranged for controlling the flow of combined fresh and used dialysate to the inlet of the hemodialyzer.

11. The dialysate delivery apparatus of claim 1 including a. heat exchanger means contained in the used dialysate recirculating reservoir in series relation with the infeed conduit means carrying fresh dialysate from the outlet of the first pump means, b. thermostatically controlled heating means associated with the used dialysate recirculating reservoir for maintaining the temperature of the used dialysate contents thereof at a predetermined temperature level, c. first regulating valve means communicating the outlet of the second pump means with the inlet of the used dialysate recirculating reservoir for controlling the proportion of used dialysate recycled to the used dialysate recirculating reservoir, d. second regulating valve means communicating the outlet of the first pump means with the fresh dialysate storage reservoir for controlling the proportion of fresh dialysate recycled to the fresh dialysate storage reservoir, e. said first and second regulating valve means being arranged to balance the outflow pressure of both the first and second pump means as required to obtain uniform flow therefrom, f. control valve means in the infeed conduit means arranged for controlling the flow of fresh dialysate to the outlet of the second pump means, and g. control valve means in the infeed conduit means for controlling the flow of combined fresh and used dialysate to the inlet of the hemodialyzer.

* * * * *